T. HEDGCOCK.
Sextant.
No. 15,162.
3 Sheets—Sheet 1.
Patented June 17, 1856.
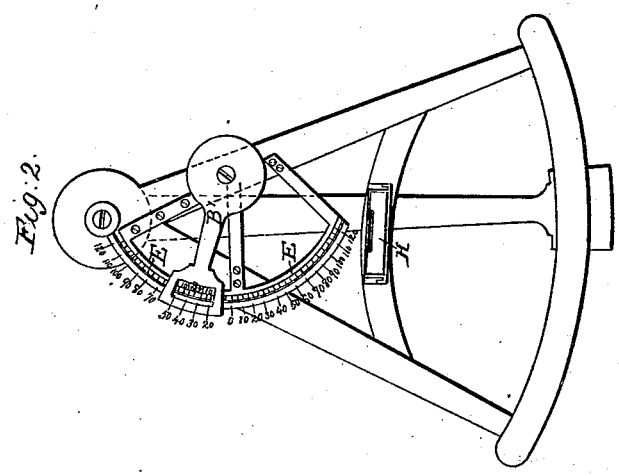
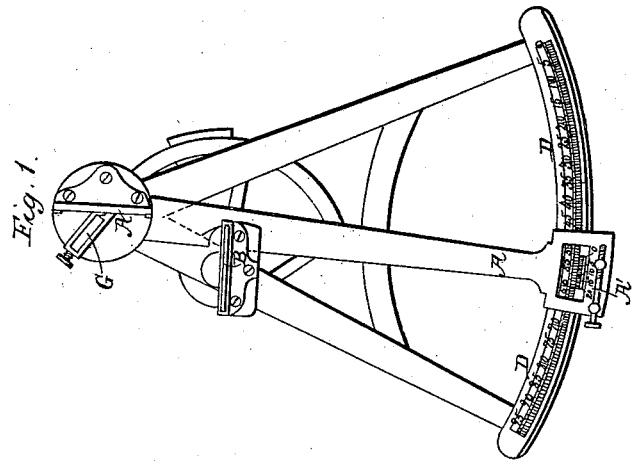
Inventor.
Thomas Hedgcock

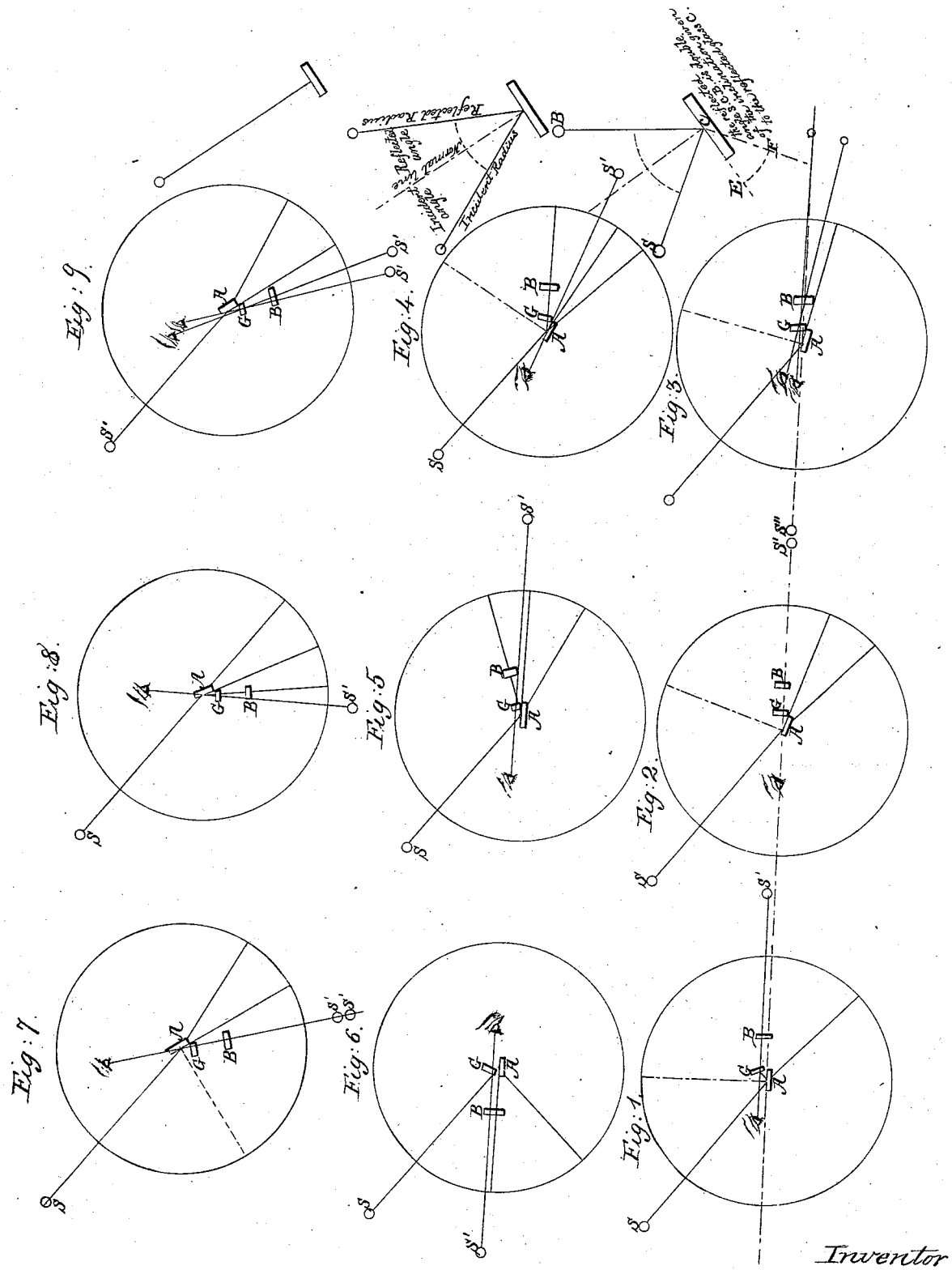

T. HEDGCOCK.
Sextant.

No. 15,162.

3 Sheets—Sheet 3.

Patented June 17, 1856.

New York.

Paris.

London.

Inventor
Thomas Hedgcock

UNITED STATES PATENT OFFICE.

THOS. HEDGCOCK, OF SURREY, ENGLAND.

REFLECTING-QUADRANT.

Specification of Letters Patent No. 15,162, dated June 17, 1856.

*To all whom it may concern:*

Be it known that I, THOMAS HEDGCOCK, of No. 7 Cavendish Grove, Wandsworth Road, in the county of Surrey, England, master in the royal navy, have invented an Improved Quadrant for Taking Solar Altitudes for Latitudes; and I do hereby declare that the following is a full and exact description thereof, reference being had to the accompanying drawings and to the letters of reference marked thereon, in which—

Figure 1:
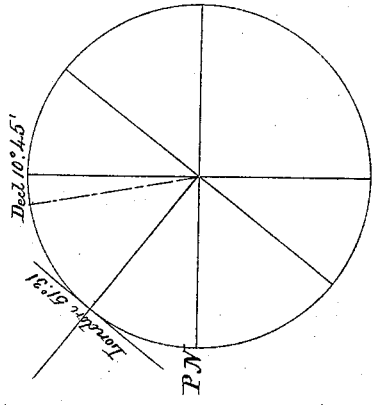
Figure 1:
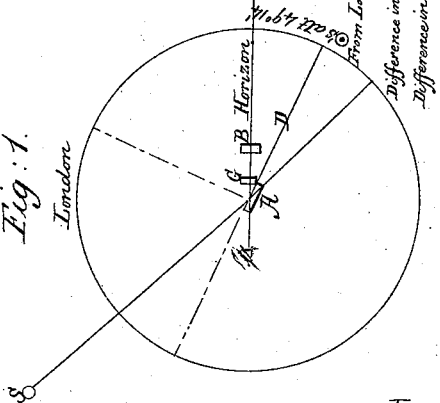

Plate 1 illustrates the construction of the quadrant. In this plate, Figure 1, is a front view and Fig. 2 a back view of the quadrant. Plates 2 and 3 illustrate its use in the taking of solar altitudes. Plates 4 and 5 illustrate the use of the quadrant in ascertaining longitude.

To enable others to make and use my invention, I will proceed to describe its construction and operation.

I construct my quadrant with a sector shaped frame and an arch D graduated from 0 to 90°, and provide it with an index glass A, attached to a bar, with a vernier scale $A^1$, in all respects like Hadley's quadrant. I also provide it with a horizon glass B, of the same size as the index glass A, half silvered. This glass is fitted to turn in a pivot. On the back part of the quadrant is fixed an arch E, F, described from the center of the pivot of the horizon glass and graduated from 0° to 120° each way; and to the pivot of the horizon glass B, is attached an index bar B', and vernier.

G, is a small planum glass which I call the detector, moving on a central pin in front of the index glass A, to be used in obtaining both latitude and longitude. This glass can be moved to any angle with the glass A.

H is a spirit level to be used in taking solar altitudes to test the correctness of the quadrant in hazy or foggy weather.

Before entering into a description of the operation of this instrument, it is necessary to explain the fundamental basis of its construction.

Mirrors have the property of reflecting the rays of light in such manner that the reflected rays form, with the surface of the mirror, an angle equal to that formed by the incident rays with the same surface. Thence, if the rays of the sun, for example, fall perpendicularly upon the surface of a mirror, they will be reflected back in the same line toward the point whence they proceed, and both images will coincide into one; but if the mirror is inclined the rays will then fall obliquely on its surface and will form with the perpendicular to the mirror, an angle equal to the inclination of the mirror; and as the angle of incidence is always equal to the angle of reflection, the reflected rays will diverge each side from the perpendicular, to the same extent; and the angle formed by both the incident and the reflected rays will be double the angle of inclination of the mirror.

Suppose, for example, that one of the edges of the reflected image of the sun, be brought so as to coincide with the edge of an object on earth; it is evident that the rays reflected from the edges of said image will coincide with the direct rays from the portion of the object which will be in contact with it. The angle formed by the direct rays from the edge of the sun's image with those from the sighted object, will be equal to the angle formed by the rays of incidence and reflection from the sun, and consequently will be double the angle of inclination of the mirror. But the quadrant is only the eighth part of a circle divided into 90 degrees and gives the means of measuring the angle in a direct way.

Figure 3:
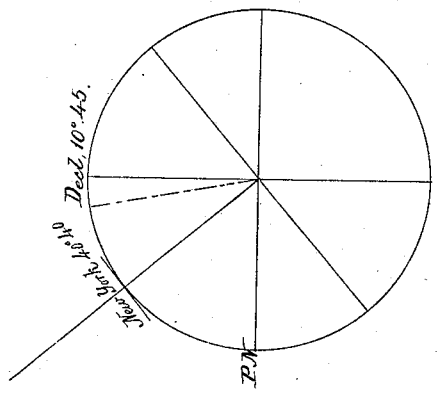
Figure 3:
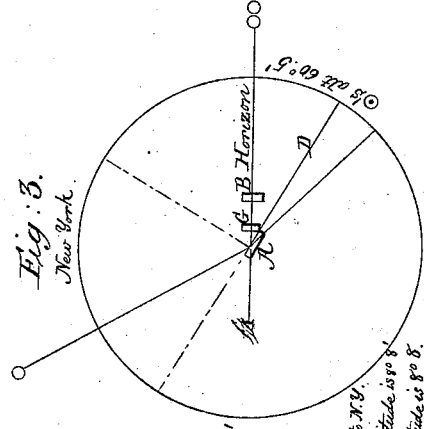
Figure 2:
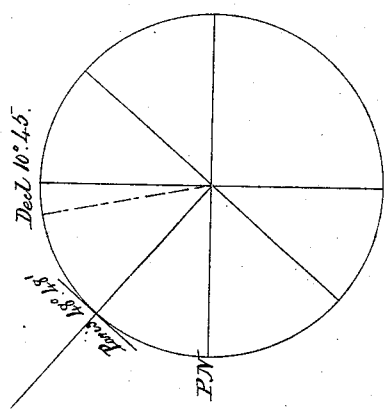
Figure 2:
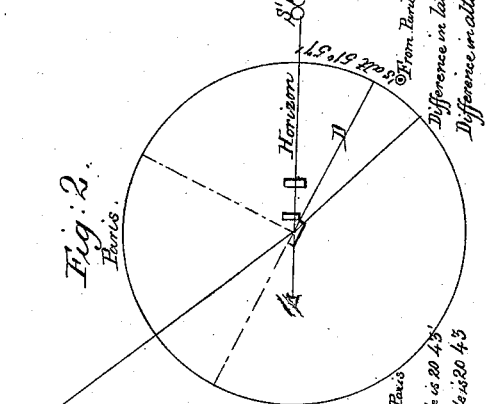

To determine the sun's altitude by means of this instrument, the vernier A', is set so that its $o$ coincides with the 90° on the arc D and the vernier of the index bar $B^1$ at $o$ of the arc E, F; in this position the mirror A and mirror B, are at right angles to each other. Then, holding the instrument vertically, as shown in Fig. 1, Plate 2, the back turned to the sun, when it is on the meridian, move the detector backward and forward until the the image of the sun is reflected on the surface of the water at the horizon line. It remains, now, to measure the angle formed by the direct with the reflected rays of the sun, passing through the operator's eye. For this purpose the index A, is moved to bring the scale A', in such a position that the direct and reflected images of the sun coincide at the horizon, and the number of degrees and minutes is read on the divided circle D. This operation is shown in Fig. 2, Plate 2. The detector G, and the mirror B, must now be parallel; if not, one of the images would be reflected above and the other below, as shown in Figs. 3, 4, 5, Plate 2. This parallelism of the mirrors G, B, is obtained by moving the scale without touching the detector.

Another way of taking the altitude of the sun, is to hold the instrument vertically toward it, with the glasses A, B, at right angles, as in Fig. 6. In this position the sun is reflected by the detector G, which is to be moved until the image is brought down to the horizon, and then, by moving the index A, measure the angle S, G, S', formed by the direct and the reflected rays of the sun S. Then hold the instrument as shown in Fig. 7 and move the index A. When the scale A', is brought over the number of degrees and minutes required by said angle, the two reflected images S, S', will be both seen in the direction shown in the figure.

Figs. 8, 9, are other positions of the instrument and show that they are not suitable for the measurement of that angle. As formerly described, the detector G, must be set so as to be parallel to the mirror B, and the instrument must be turned in the proper position to receive the rays of the sun. These two ways of obtaining the altitude of the sun are perfectly accurate when the sun's image has been reflected down to the horizon. When the latitude of the starting point is known and the declination for that day (after correcting, as usual in similar operations) the vernier A', is brought to the degree of latitude, the detector G, set parallel to mirror B', and in this situation, when the sun will pass over the meridian, both images will be reflected at the horizon. Figs. 1, 2, 3, Plate 3, demonstrate correctly the above.

The latitude of London is 51° 31'—but the declination be 10° 45', the sun's altitude will be 49° 14'. Bringing the vernier A, to the number of degrees corresponding with this altitude, both images will be reflected at the horizon.

The latitude of Paris is 48°, 48', declination 10°, 45' sun's altitude when it passes over the meridian will be 51°, 57', and both images reflected at the horizon.

The difference of latitude between Paris and London, 2°, 43'; difference in the altitude, 2°, 43'.

There are other modes of using the quadrant in taking altitudes but the illustration of the methods above described, will be sufficient to explain its practical operation. It is now only necessary to remark that the same relative positions of the index glass A, and horizon glass B may be obtained by moving the horizon glass and its index B, on the scale of the arc E, F, instead of moving the index glass A, but this movement is to be used more as a test of the correctness of the quadrant than for the purpose of taking observations.

What I claim as my invention and desire to secure by Letters Patent, is

The detector glass G applied and operating as described in combination with the index glass A, and horizon glass B, for the purpose of facilitating observations in the manner herein set forth.

THOMAS HEDGCOCK.

Witnesses:
JOHN AVERY,
GEORGE WELLS.